(No Model.)

W. E. JONES & H. WINNIATT.
PIPE CONNECTION.

No. 359,394. Patented Mar. 15, 1887.

WITNESSES:
Theo. G. Hoster
C. Sedgwick

INVENTOR:
W. E. Jones
H. Winniatt
BY Munn & Co.
ATTORNEYS.

United States Patent Office.

WILLIAM E. JONES AND HARRY WINNIATT, OF EL PASO, TEXAS.

PIPE-CONNECTION.

SPECIFICATION forming part of Letters Patent No. 359,394, dated March 15, 1887.

Application filed July 13, 1886. Serial No. 207,906. (No model.)

*To all whom it may concern:*

Be it known that we, WILLIAM E. JONES and HARRY WINNIATT, both of El Paso, in the county of El Paso and the State of Texas, have invented a new and Improved Pipe-Connection, of which the following is a full, clear, and exact description.

The object of our invention is to provide a new and improved pipe-connection which permits of swinging the several connected pipe-sections at angles to each other.

The invention consists of two pipe-heads fastened together and turning on a spring-bolt, and of a packing placed between the said pipe-heads to prevent leakage.

Reference is to be had to the accompanying drawings, forming a part of this specification, in which similar letters of reference indicate corresponding parts in all the figures.

Figure 1:
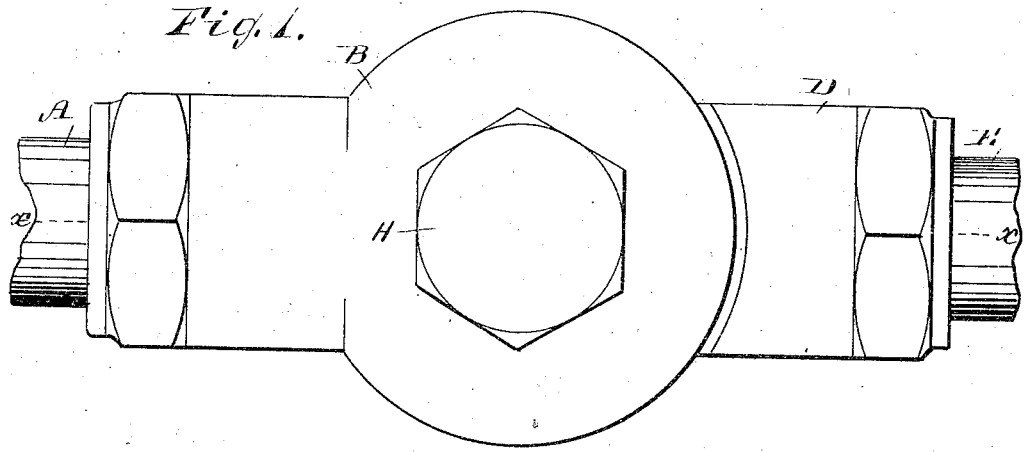
Figure 2:
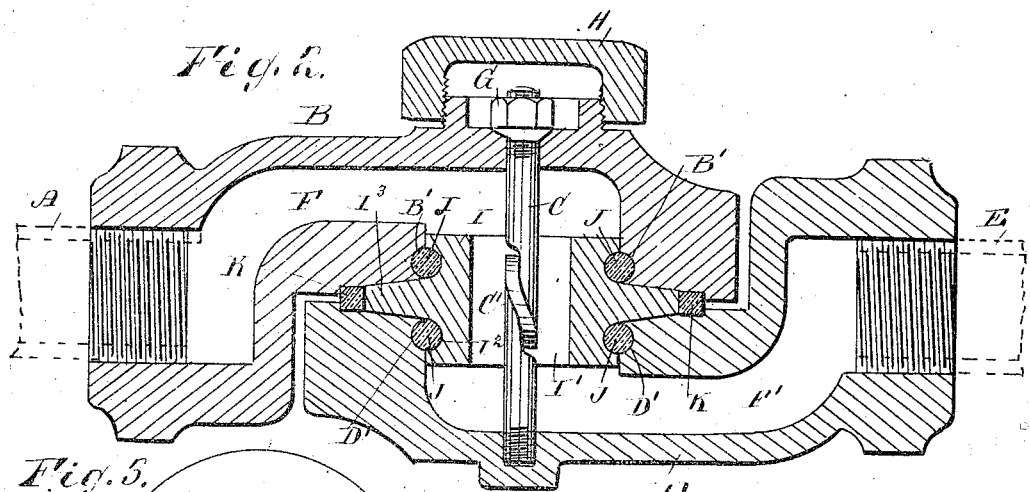
Figures 3, 4:
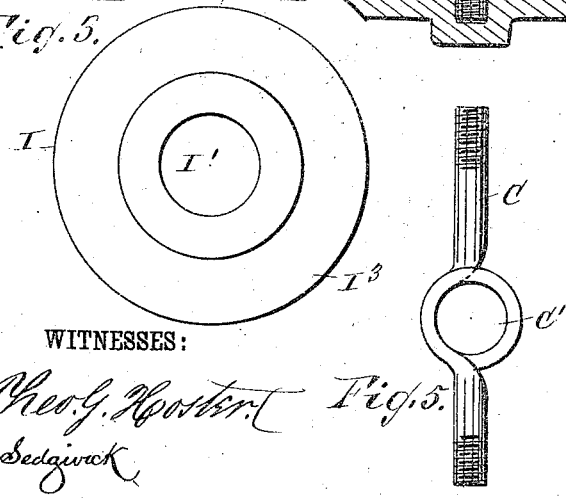
Figure 5:
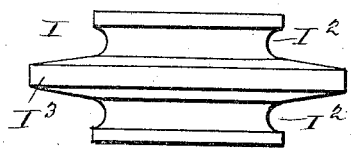

Figure 1 is a plan view of our improvement. Fig. 2 is a sectional elevation of the same on the line $x\,x$ of Fig. 1. Fig. 3 is a face view of the metal packing-ring. Fig. 4 is a side elevation of the same, and Fig. 5 is an end elevation of the connecting spring-bolt.

The pipe A is provided with the head B, which is connected by the bolt C with the head D of the pipe E, and communication is established between the pipes A and E by the channels F and F', formed, respectively, in the heads B and D.

The bolt C is secured centrally to the head D, passes through an aperture in the head B, and is provided on its outer end with a screw-thread, on which screws the nut G. The nut G is covered by a cap, H, screwing on a projection formed on the top of the head B. The bolt C is formed into a coil spring, C', near its center.

Between the heads B and D is placed a metal ring, I, having a central aperture, I', through which the said bolt C passes, and it is also provided with annular grooves I², in each of which fits part of a rubber ring or gasket, J, which also fits into the groove B' or D', formed, respectively, in the heads B and D. The ring I is provided with a central annular projection, I³, which is encircled by a rubber ring or gasket, K, placed between the contacting surfaces of the heads.

It will be seen that the heads B and D can be turned at angles to each other, swinging on the bolt C as their common center. The bolt C is also the means for holding the pipe-heads B and D together, and its central spring, C', has the tendency to draw the heads B and D tightly upon the rubber gaskets J and K. The inner rubber rings or gaskets, J, are pressed tightly between the ring I and the heads B and D, respectively, and prevent leakage from the channels F and F', and the rubber ring or gasket K prevents substances from passing inward from the outside.

Having thus fully described our invention, we claim as new and desire to secure by Letters Patent—

1. In a pipe-connection, the heads B and D, in combination with the spring-bolt C, substantially as shown and described.

2. In a pipe-connection, the heads B and D, in combination with the bolt C, having the spring C' and the nut G, substantially as shown and described.

3. In a pipe-connection, the heads B and D, in combination with the metal ring I and the rubber gaskets J and the spring-bolt C, substantially as shown and described.

4. In a pipe-connection, the heads B and D, the metal ring I, having the grooves I², and the annular projection I³, in combination with the gaskets J and K, substantially as shown and described.

5. In a pipe-connection, the heads B and D, in combination with the metal ring I and the gaskets K and the spring-bolt C, substantially as shown and described.

6. In a pipe-connection, the heads B and D, the spring-bolt C, provided with the spring C', and the nut G, in combination with the metal ring I and the gaskets J and K, substantially as shown and described.

W. E. JONES.
HARRY WINNIATT.

Witnesses:
JOHN BAILEY,
O. D. OWEN.